United States Patent Office 2,818,403
Patented Dec. 31, 1957

2,818,403
POLYVINYL ACETALS OF ALDEHYDES CONTAINING A BETAINE GROUP

Walter Edwin Mochel and Clay Weaver, Wilmington, Del., assignors to E. I. du Pont de Nemours and Company, Wilmington, Del., a corporation of Delaware No Drawing. Original application July 26, 1954, Serial No. 445,918, now Patent No. 2,753,264, dated July 3, 1956. Divided and this application December 1, 1955, Serial No. 550,457

3 Claims. (Cl. 260—73)

This invention is concerned with polymers of high molecular weight having protective colloid properties. More particularly it relates to polyvinyl acetals of aldehydes which contain a betaine group. The invention further relates to dispersions of light-sensitive silver halide in such polymers.

Gelatin has generally been employed as the protective colloid for photosensitive silver halides since it has the ability to form upon a sheet support a thin coating containing dispersed photographic silver halides. Gelatin has good water permeability coupled with insolubility at relatively low temperatures. However, photographic emulsions based on gelatin are somewhat brittle, unstable, susceptible to decomposition by bacteria and fungi, and they are difficult to maintain and process under conditions of high humidity and temperature.

Considerable effort has been made to replace gelatin with a synthetic polymeric colloid binder and moderate success has been obtained with polyvinyl alcohols and particularly with certain acetals thereof that are soluble in hot water but insoluble in cold water. Amino acetals of polyvinyl alcohol have been suggested as gelatin substitutes, as described in U. S. 2,276,322. Polyvinyl acetals containing a quaternary ammonium group have been proposed as dispersing agents for silver halide in conjunction with the conventional colloids employed, such as gelatin, as described in U. S. 2,358,836, but they cannot be employed alone as gelatin substitutes because of their solubility in cold water.

It has now been found that acetals of a vinyl alcohol polymer containing a sufficient number of intra linear —$CH_2CHOH$— groups so that it is water-soluble or hydrophilic in character with aldehydes containing betaine-groups, that have protective colloid properties can be prepared by reacting a vinyl alcohol polymer having a large number of intralinear —$CH_2CHOH$— groups with a betaine-containing aldehyde, or a monomeric acetal thereof with an alkanol of 1 to 4 carbon atoms or a 1,2- or 1,3- alkanediol of 2 to 4 carbon atoms, in the presence of an acid catalyst, e. g. hydrochloric, phosphoric, sulfuric, para-toluenesulfonic, methanesulfonic and chloracetic acid, at a temperature from 30 to 100° C., or more, for a period of ½ to 48 hours.

The vinyl alcohol polymers or synthetic hydroxylated polymers used in the preparation of the polyvinyl acetals having betaine-containing acetal groups include the well-known hydroxyl polymers prepared by polymerizing a vinyl ester such as vinyl acetate, vinyl propionate, vinyl benzoate, etc., alone or with minor proportions (10% or less) of an unsaturated copolymerizable monomer, followed by partial or complete hydrolysis. Such polymers have a linear chain consisting predominantly of

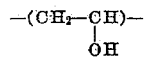

groups. These polymers as stated above are water-soluble or hydrophilic in character and have at least 40 aliphatic hydroxyl groups per 100 chain atoms. The polymers, including copolymers, may have a minor number (e. g., 10% or less) of the hydroxyls modified with other groups, e. g., ether or ester groups. In the case of the copolymers, their partially hydrolyzed products, or the polymeric materials obtained by further reaction, e. g., etherification, esterification or acetalization, it is necessary that at least 40 alcoholic hydroxyls be present per each 100 chain atoms, which are generally carbon. In the case of polyvinyl alcohol (completely hydrolyzed polyvinyl esters), there are a total of 50 hydroxyls to each 100 chain carbon atoms. For best results, the polymer should have a high molecular weight, e. g., at least 10,000 and preferably 35,000 or higher.

The preferred betaine-containing reactants, in the form of their adehydes, can be represented by the general formula:

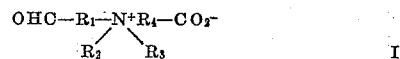

I where $R_1$ is a divalent organic radical of 1 to 10 carbon atoms having a carbon atom of a hydrocarbon nucleus attached to the —CHO group and an acyclic —$CH_2$— group attached to the N atom, $R_2$ and $R_3$ are alkyl radicals of 1 to 6 carbon atoms, preferably 1 to 3 carbon atoms and $R_4$ is a divalent saturated hydrocarbon radical of 1 to 5 carbon atoms.

Suitable alkyl radicals for $R_2$ and $R_3$ include methyl; ethyl, propyl, isopropyl, n-butyl, -pentyl and hexyl and suitable radicals $R_4$ are methylene, bimethylene, trimethylene, tetramethylene, pentamethylene and n-butylmethylene. In the case of $R_1$ an important class of radicals is the saturated aliphatic hydrocarbon radicals, or polymethylene radicals of 1 to 4 carbon atoms, i. e., methylene, ethylene tri- and tetra-methylene.

The betaine-containing polyvinyl acetals obtainable in accordance with the invention contain recurring intralinear —$CH_2CHOH$— groups and intralinear groups or units which have the general formula:

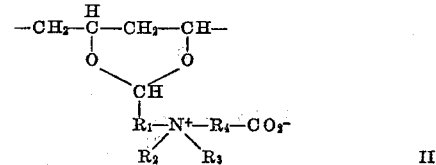

II where $R_1$, $R_2$, $R_3$ and $R_4$ have the values given in Formula I. The free bonds of the units of this Formula II are, of course, connected to carbon atoms in the linear chain of the original vinyl alcohol polymer. These polyvinyl acetals have protective colloid properties and are hydrophilic and swell in water but are insoluble in cold water (i. e., at 20° C.). They are soluble to an extent of at least 5% by weight in ethanol-water mixtures containing 20% by weight of ethanol at 80° C. to 100° C.

Dispersions of light-sensitive silver halide in the novel betaine-contining polyvinyl acetals of this invention can be made in various ways, e. g., (a) by mixing an aqueous dispersion of silver halide with an aqueous solution of the acetal, or (b) by precipitating silver halide in such an aqueous solution. In the latter case, a water-soluble silver salt, e. g., silver nitrate, is admixed with a water-soluble halide, e. g., sodium, potassium or ammonium chloride, bromide or iodide, in the presence of the betaine-containing polyvinyl acetal in aqueous solution. Mixtures of two or more silver salts and/or halides can be used. The resulting dispersions can be bulked up with added portions of such polyvinyl acetal or with other polyvinyl acetals, including polyvinyl acetal color-formers as disclosed in Jennings et al. U. S. Patent 2,397,864, polyvinyl alcohol, gelatin or other natural or synthetic colloids. In general, the silver halide dispersions should contain 50% to 100% by weight of the betaine-containing polyvinyl acetals, based on the weight of the silver halide when used as the only binder. When other binders are present, the betaine-containing polyvinyl acetal may be present in lower amounts, even as low as 1% by weight.

Sensitizing dyes, anti-fogging agents, color formers and other emulsion adjuvants can be added to the resulting aqueous dispersions and they can be coated on a suitable support to form light-sensitive layers in photographic films, plates and papers. These layers even as low as 5 microns in thickness do not dissolve but are freely permeable to water and aqueous photographic processing solutions.

The betaine-containing polyvinyl acetals used in making the photographic compositions can be prepared by reacting polyvinyl alcohol with a betaine-containing aldehyde in the presence of an acid catalyst. The preferred betaine-containing aldehydes are those of formula

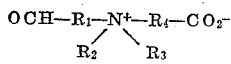

where $R_1$ is a divalent organic radical, preferably hydrocarbon or an amide-interrupted hydrocarbon radical, containing 1 to 10 carbons, $R_2$ and $R_3$ are alkyl radicals, of 1 to 6 carbon atoms preferably of 1 to 3 carbons each, and $R_4$ is a divalent hydrocarbon radical of 1 to 5 carbons. In place of reacting the betaine-containing aldehyde directly with polyvinyl alcohol, it is usually more satisfactory to first prepare a monomeric acetal from the betaine-containing aldehyde and a monomeric alcohol, particularly ethylene glycol, and then to convert this monomeric acetal to the corresponding polyvinyl acetal by acetal interchange with polyvinyl alcohol.

Examples illustrating the preparation of betaine-containing polyvinyl acetals and their use in making photographic emulsions are given below. The parts given are by volume, unless otherwise designated. When parts by weight are mentioned, they correspond to the weight of the same volume of water.

EXAMPLE I

A. Preparation of the polyvinyl acetal

The betaine-aldehyde ethylene glycol acetal of the structure:

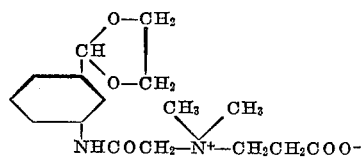

was prepared by the following procedure:

1. m-(CHLOROACETAMIDO)BENZALDEHYDE ETHYLENE GLYCOL ACETAL

A solution of 83 parts, by weight, of m-aminobenzaldehyde ethyleneglycol acetal in 250 parts of dioxane is mixed with a solution of 53 parts of anhydrous sodium carbonate in 250 parts of water and stirred at 5° C. while adding a solution of 56 parts, by weight, of chloroacetyl chloride in 50 parts of dioxane at 5–10° C. The reaction mixture is stirred for 1.5 hours and the product is isolated by adding excess water and filtering. The product is purified by recrystallization from alcohol/water (3.5/2 by volume). The pure m-(chloroacetamido)benzaldehyde ethylene glycol acetal has a melting point of 90–92° C. and is isolated in 83% yield.

2. m-[(DIMETHYLAMINO)ACETAMIDO]BENZALDEHYDE ETHYLENE GLYCOL ACETAL

A solution of 48 parts, by weight, of the chloroacetyl derivative in 500 parts of benzene is stirred at room temperature and 40 parts, by weight, of gaseous dimethylamine is introduced. The reaction mixture is allowed to stand at room temperature for several hours (overnight), filtered and the excess benzene removed by evaporation until about 50 parts of m-[(dimethylamino)acetamido]-benzaldehyde ethylene glycol acetal, in the form of an oily substance, remains.

3. BETAINE OF m-[(DIMETHYLAMINO)ACETAMIDO]-BENZALDEHYDE ETHYLENE GLYCOL ACETAL

A solution of 50 parts of the oily substance obtained in step 2 in 200 parts of anhydrous ether and 75 parts of acetonitrile is stirred at 10° C. while adding slowly a solution of 15 parts, by weight, of β-propiolactone in 50 parts of anhydrous ether. The mixture is allowed to stand several hours and the white crystalline product that separates is removed by filtration and washed with ether. The melting point of the product, namely, the betaine of m-[(dimethylamino)acetamido]benzaldehyde ethylene glycol acetal (48 parts by weight) is 123–123.5° C., after recrystallizing it twice from 95% ethanol.

*Anal.*—Calcd. for $C_{16}H_{22}O_5N_2$(betaine): C, 59.6; H, 6.9; N, 8.7. Found: C, 59.5; H, 7.1; N, 8.5.

A mixture of 10 parts, by weight, of polyvinyl alcohol having a viscosity of about 25 poises in 4% by weight solution in water at 25° C., made by completely hydrolyzing polyvinyl acetate, in 60 parts of ethylene glycol, 5 parts of distilled water and 5 parts of 92% phosphoric acid is stirred at room temperature for 10 minutes, then at 70° C. for 15 minutes. A solution of 2 parts, by weight, of the betaine derivative (prepared from m-dimethylamino-acetamidobenzaldehyde ethylene glycol acetal and β-propiolactone as described above) in 10 parts of ethylene glycol is added dropwise and stirring continued at 70° C. for 2.5 hours. The reaction mixture is cooled to room temperature and the catalyst neutralized with a 10% solution of triethylamine in methanol. An excess of methanol is added, the betaine-containing polyvinyl acetal is separated by filtration, and washed in two changes of methanol followed by two changes in acetone. The weight of the final product after filtration is 10.7 parts. The betaine polyvinyl acetal is almost white, is readily soluble in hot water and contains about 9% (weight basis) of the betaine aldehyde substituent as determined by nitrogen analysis. (Polyvinyl acetals containing a lower percentage of the betaine substituent can be prepared by employing less of the betaine-aldehyde ethylene glycol acetal or by shortening the reaction time.) Similarly products containing a higher percentage of the betaine substituent can be obtained by increasing the amount of monomeric acetal and/or increasing the reaction time.

B. Preparation of photographic emulsion

A solution is made from one part (by weight) of the betaine-aldehyde polyvinyl acetal, 45 parts of water, and 5 parts of ethyl alcohol and mixed with 50 parts of water, 23 parts of 3 N ammonium bromide and 1.2 parts of 0.5 N potassium iodide. This solution is stirred at 40° C. and a solution of 10 parts of 3 N silver nitrate (converted to the soluble complex with 20% ammonium hydroxide) and 50 parts of water is added slowly. The emulsion is stirred at 40° C. for one hour and treated with a second solution containing 10 parts of 3 N silver nitrate converted to the soluble complex with ammonium hydroxide. Stirring at 40° C. is continued for ½ hour and the emulsion is coagulated by the addition of an excess of acetone. The coagulum is diced and washed in running water for ½ hour and treated with 180 parts (by weight) of a 5% solution of a completely hydrolyzed polyvinyl alcohol (U. S. Patent 2,579,016). The emulsion is stirred at 70° C. for ½ hour and treated with 4 parts of a 1% solution of C-cetylbetane (spreading assistant). Viscosity is adjusted to a predetermined value by dilution with 20% ethyl alcohol, and coated on a suitable support such as paper or transparent film base. When the dried coating is exposed and developed by standard photographic procedures, a black and white image of a good gradation is formed.

A photographic emulsion having good photographic properties is also obtained by the above method when the bulk polymer solution added to the washed coagulum is a 5% solution of the betaine-aldehyde polyvinyl acetal in place of polyvinyl alcohol.

EXAMPLE II

Photographic silver halide is prepared as described in Weaver U. S. appl. Ser. No. 362,151 (filed June 16, 1953), U. S. Patent 2,752,246 granted June 26, 1956 by stirring a solution (A) consisting of 46 parts of 3 N ammonium bromide, 2.5 parts of 0.5 N potassium iodide, 50 parts of distilled water and 25 parts of a 10% solution of the condensation product of 20 moles of ethylene oxide with 1 mole of oleyl alcohol, and adding a solution (B) consisting of 20 parts of 3 N silver nitrate (converted to the soluble complex with 20% ammonium hydroxide) in sufficient distilled water to make a total volume of 250 parts. The silver halide thus formed is ripened by stirring the mixture slowly at 30° C. for 30 minutes, allowing the crystals to settle, and then decanting the supernatant liquid containing soluble salts. The silver halide precipitate is treated with a solution containing one part (by weight) of the betaine-aldehyde polyvinyl acetal of Example IA in 20 parts of water and stirred for 15 minutes at 40° C. The dispersion is treated with 150 parts of a 5% solution of a completely hydrolyzed polyvinyl alcohol (described in U. S. Patent 2,579,016). This emulsion is coated, dried and processed as described in Example I. The emulsion has good photographic properties.

EXAMPLE III

A polyvinyl mixtd acetal containing both color-forming groups and betaine-containing groups is prepared by stirring a mixture of 10 parts, by weight, of a completely hydrolyzed polyvinyl alcohol of the type described in Example I in 60 parts of ethylene glycol, 5 parts of distilled water, 5 parts of 92% phosphoric acid and one part by weight of m-[(dimethylamino)acetamido]benzaldehyde ethylene glycol acetal described in Example I for 30 minutes at 70° C. A solution of one part by weight of the cyan color-forming monomer, m-(1-hydroxy-2-naphthamido)benzaldehyde ethylene glycol acetal (described in Example I of Corner et al., U. S. Patent 2,465,067) in 5 parts of dioxane is added to the mixture and stirring at 70° C. is continued for 2.5 hours. When the product is isolated and purified as described above, there is obtained 11 parts by weight of the mixed polyvinyl acetal containing cyan color-forming groups and the betaine substituent. This product is insoluble in cold water, but is hydrophilic in character, and is soluble in aqueous ethanol and is suitable as a binding agent for silver halide grains and can be admixed with water-permeable colloid silver halide emulsions.

The amount of betaine-containing aldehyde or monomeric acetal employed in making the polyvinyl acetals must be sufficient to give a polyvinyl acetal containing at least 1% by weight of the betaine-containing component. The upper practical limit of betaine content for use in this invention is about 25%. In general, the polyvinyl acetal will contain from 2 to 20%, preferably 4–10% (by weight), of the betaine-containing component. For a betaine aldehyde of average molecular weight, this corresponds to the substitution (acetalization) of from 1–4% (and preferably 2–3%) of the alcoholic hydroxyls of the polyvinyl alcohol by the betaine-containing reactant. Following the acetal-forming reaction, the acid catalyst is neutralized (preferably to a pH of about 7–8) by the use of sodium or potassium hydroxide, carbonate, or bicarbonate, or an organic base, e. g., an amine, e. g., dimethylamine, diethylamine, cyclohexylamine, pyridine, etc.

Examples of specific betaine-aldehydes that can be used in the preparation of the polyvinyl acetals in this invention include those illustrated by the following formulas:

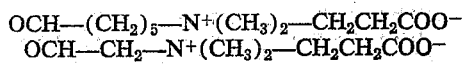
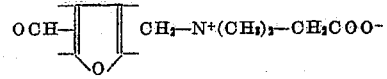
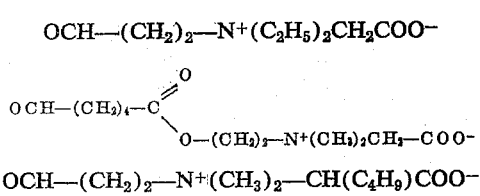

$$OCH-(CH_2)_2-N^+(C_2H_5)_2CH_2COO^-$$

$OCH-(CH_2)_4-C\underset{O-(CH_2)_3-N^+(CH_3)_2CH_2-COO^-}{\overset{O}{\diagup}}$ $$OCH-(CH_2)_2-N^+(CH_3)_2-CH(C_4H_9)COO^-$$

The above-listed betaine aldehydes are obtainable by several methods. For example, an aldehyde which contains a tertiary amino group can be treated with a lactone such as β-propiolactone, or with an α- or β-chloroacid, such as chloroacetic or β-chloropropionic, followed by removal of the halogen. A suitable general procedure for the preparation of betaines by the lactone method is described by Gresham et al., J. Am. Chem. Soc. 73, 3168 (1951). If desired, the aldehyde group can be converted to a monomeric acetal, e. g., the dimethyl acetal and ethylene glycol acetal to increase its stability. As already indicated, the monomeric betaine acetal can be employed directly in the formation of the polyvinyl acetal by an acetal interchange reaction; in fact, this is the preferred procedure. The preparation of polyvinyl acetals is suitably carried out by employing the general procedure described above. They can be made by substituting the above-listed betaine aldehydes or their monomeric acetals, in equivalent amount, for the betaine-aldehyde ethylene glycol acetal of the formula given in Example I and carrying out the procedure of that example. Similarly, dispersions of silver halide in the betaine-aldehyde polyvinyl acetals, made as just described, can be made by substituting them for the specific acetal of Example II.

The polyvinyl acetals of betaine-containing aldehydes are advantageous in that they constitute new protective colloids. These colloids facilitate the preparation of uniform dispersions of silver halide. These polyvinyl acetals appear strongly absorbed on the silver halide grains and increase the sensitivity of the silver halide when employed in polyvinyl alcohol and polyvinyl acetal color-former systems. A particularly effective use of the betaine polyvinyl acetal protective colloids is in conjunction with polyvinyl acetal color-forming polymers, with which they are compatible. Such polyvinyl acetal color formers are further described in U. S. 2,310,943, 2,380,032, 2,423,572, 2,476,988, 2,489,655 and 2,513,189 and 2,513,190. The polymeric betaine acetals are useful in making filter layers, protective layers and anti-halation layers in photographic films and papers.

This application is a division of Serial Number 445,918, filed July 26, 1954, now Patent Number 2,753,264.

The embodiments of the invention in which an exclusive property or privilege is claimed are defined as follows:

1. Polyvinyl acetals which contain recurring intralinear —$CH_2CHOH$— groups and groups of the formula:

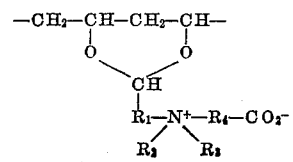

wherein $R_1$ is a divalent organic radical of 1 to 10 carbon atoms having a carbon atom of a hydrocarbon nucleus attached to the —CHO group and an acyclic —$CH_2$— group attached to the N atom, $R_2$ and $R_3$ are alkyl radicals of 1 to 6 carbon atoms and $R_4$ is a divalent saturated aliphatic hydrocarbon radical of 1 to 5 carbon atoms.

2. Polyvinyl acetals which contain recurring intralinear —$CH_2CHOH$— groups and groups of the formula:

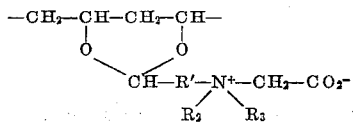

wherein R' is a polymethylene radical of 1 to 4 carbon atoms and $R_2$ and $R_3$ are alkyl radicals of 1 to 3 carbon atoms.

3. Polyvinyl acetals which contain recurring intralinear —$CH_2CHOH$— groups and groups of the formula:

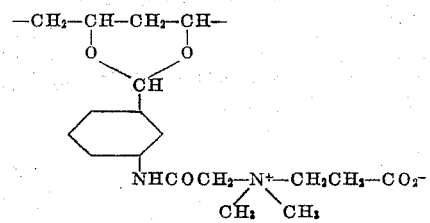

References Cited in the file of this patent
UNITED STATES PATENTS
2,680,731   Martin _____ June 8, 1954